United States Patent [19]

Harbour et al.

[11] Patent Number: 4,566,134

[45] Date of Patent: Jan. 21, 1986

[54] CIRCUIT FOR INTERFACING REMOTE FUNCTIONAL UNITS TO A TERMINAL

[75] Inventors: Edward E. Harbour; Robert C. Lynch, both of Cary; George R. Stilwell, Jr., Raleigh, all of N.C.

[73] Assignee: International Business Machines Corp., Armonk, N.Y.

[21] Appl. No.: 679,526

[22] Filed: Dec. 7, 1984

Related U.S. Application Data

[63] Continuation of Ser. No. 456,071, Jan. 6, 1983, abandoned.

[51] Int. Cl.⁴ .............................................. H04B 9/00
[52] U.S. Cl. ...................................... 455/607; 372/38; 455/612; 455/613; 455/618
[58] Field of Search ............... 455/600, 601, 602, 606, 455/607, 612, 617, 618, 619, 603, 613; 370/1, 3, 4; 372/38

[56] References Cited

U.S. PATENT DOCUMENTS

| | | | |
|---|---|---|---|
| 4,107,518 | 8/1978 | McMalton ........................... | 455/601 |
| 4,234,970 | 11/1980 | Beasley et al. ...................... | 455/607 |
| 4,281,253 | 7/1981 | Culver ................................. | 455/607 |
| 4,393,515 | 7/1983 | de Neumann ....................... | 455/601 |
| 4,408,353 | 10/1983 | Bowen et al. ....................... | 455/606 |
| 4,446,550 | 5/1984 | Brajder et al. ...................... | 370/16 |

FOREIGN PATENT DOCUMENTS 2333968 1/1975 Fed. Rep. of Germany ...... 455/606

OTHER PUBLICATIONS

Gfeller et al.—"Local Area Fiber-Optic"—IBM Tech. Discl. Bulletin, vol. 22, #8B, Jan. 1980, pp. 3815, 3816.

Primary Examiner—Joseph A. Orsino, Jr.
Attorney, Agent, or Firm—Joscelyn G. Cockburn

[57] ABSTRACT

In a highly modular terminal, pluggable functional units communicate optically through a closed chamber. Some functional units are logically integrated into the terminal structure while being physically remote. In a supermarket system, bar code scanners and produce scales are examples of physically remote functional units. A circuit for interfacing the remote units to the closed chamber uses a broadcast/concentrator mode of operation. A single optical detector broadcasts the extant chamber signals to all of the remote functional units. Signals from the remote units are logically ORed or concentrated to provide a drive signal for a single optical emitter capable of injecting optical energy into the chamber.

16 Claims, 5 Drawing Figures

CIRCUIT FOR INTERFACING REMOTE FUNCTIONAL UNITS TO A TERMINAL

This application is a continuation of U.S. patent application Ser. No. 456,071, filed Jan. 6, 1983, now abandoned.

TECHNICAL FIELD

The present invention relates to data processing terminal devices and more particularly to a circuit for interfacing remote functional units to a type of terminal device utilizing a closed chamber as an inter-unit optical communications link.

BACKGROUND OF THE INVENTION

Any data processing terminal device, ranging from a simple calculator to a complex point-of-salt terminal, can be viewed as a combination of functional units (controllers, printers, displays, etc.), each of which has a dedicated function to perform as well as a need to exchange data and control signals with at least some of the other functional units.

Conventionally, the functional units have been linked through electrical wires usually in the form of electrical cables. Cables have known disadvantages. Cables usually represent a significant portion of the component cost of a terminal device. The time and labor required to assemble terminal devices with electrical cables are also normally significant. Moreover, electrical cables are susceptible to electric noise or stray signals which can produce errors in the data or control information being transmitted between functional units.

To avoid some of these problems, proposals have been made that optical fibers be used to provide communications links between the functional units. Optical fibers are less susceptible to noise or stray signals than electrical cables but cost more and are harder to work with during terminal assembly operations.

To overcome some of the known problems of electrical or optical cables, a cable-free chamber has been disclosed as an optical communications link between functional units in a terminal device.

U.S. Pat. No. 4,063,083 discloses a system having an optical link in which a single beam of optical energy is transmitted along a straight line within a closed chamber from one pluggable card to the next. At each card the optical energy may be protected, modified and retransmitted to the next card along the line. Lenses are included for maintaining the beam focus.

While the approach disclosed in this patent avoids some of the problems inherent in the use of electrical or optical cables, certain other problems seem to be created. The terminal device would have to be carefully assembled to maintain the proper beam alignment. Also, the arrangement is somewhat inflexible in that the cards must be arranged in series along the beam path.

An alternative approach to closed chamber optical communications is disclosed in co-pending application Ser. No. 362,681, filed Mar. 29, 1982, and assigned to the assignee of the invention. According to that application, one or more functional units can be plugged into a frame adjacent a substantially enclosed optical chamber. A transducer on each functional unit can inject optical energy into the chamber through an opening in one wall thereof and can detect optical energy injected by other transducers through similar openings. Within the chambers, injected optical signals are diffusely reflected from the interior walls and are "scattered" to other transducers.

Co-pending application Ser. No. 362,681, filed Mar. 29, 1982, now U.S. Pat. No. 4,527,285, discloses a different terminal structure in which optical energy injected into the chamber is not diffusely reflected but is instead confined to predetermined paths by ellipsoid parabolic reflectors, preferably molded integrally with the floor of the optical chamber.

Prior art terminal devices using optical communications have not addressed the problem of interfacing remote functional units to the remainder of the terminal. Remote functional units are units which are logically an integral part of the terminal structure but are physically located at some distance from the remainder of the terminal. Remote functional units are connected to the terminal by means of optical or electrical cables. In a supermarket environment, produce scales and bar code scanners are examples of remote functional units. In a retail store environment, a display might be located remotely from the remainder of the terminal.

The straightforward approach to interfacing remote functional units to the remainder of a closed chamber communications terminal would be to provide complete, self-contained interface circuits for all of the remote functional units. That is, each interface circuit would include both an optical emitter and an optical detector in communication with the optical chamber.

There are drawbacks to this straightforward approach. The cost of having complete, self-contained interface circuits for all remote units would be high. Moreover, it would very likely be difficult to physically locate all of the necessary interface circuits in the optical chamber in locations in which optical signals could be received at suitable levels and in which one unit would not "shade" or partially block signal paths to one or more other remote functional units.

SUMMARY OF THE INVENTION

The present invention is a circuit for interfacing one or more remote functional units to a terminal device which also has one or more integrated functional units which communicate optically by means of signals propagated through a closed chamber. The interface circuit uses a relatively few components and requires relatively little space within the chamber in order to perform its intended function.

The interface circuit includes an optoelectronic transducer having a detector which responds to optical energy being propagated through the chamber to generate representative signals. The transducer further includes an emitter which converts signals from the remote functional units to an optical form suitable for injection into the chamber. Signals generated by the detector are distributed to cables leading to each of the remote functional units. The interface circuit further includes means for concentrating signals received through any of the cables to provide a single drive signal for the emitter in the optoelectronic transducer.

BRIEF DESCRIPTION OF THE DRAWINGS

While the specification concludes with claims particularly pointing out and distinctly claiming that which is regarded as the present invention, details of preferred embodiments of the invention may be more readily ascertained from the following detailed description when read in conjunction with the accompanying drawings wherein:

DESCRIPTION OF THE PREFERRED EMBODIMENTS

Figure 1:
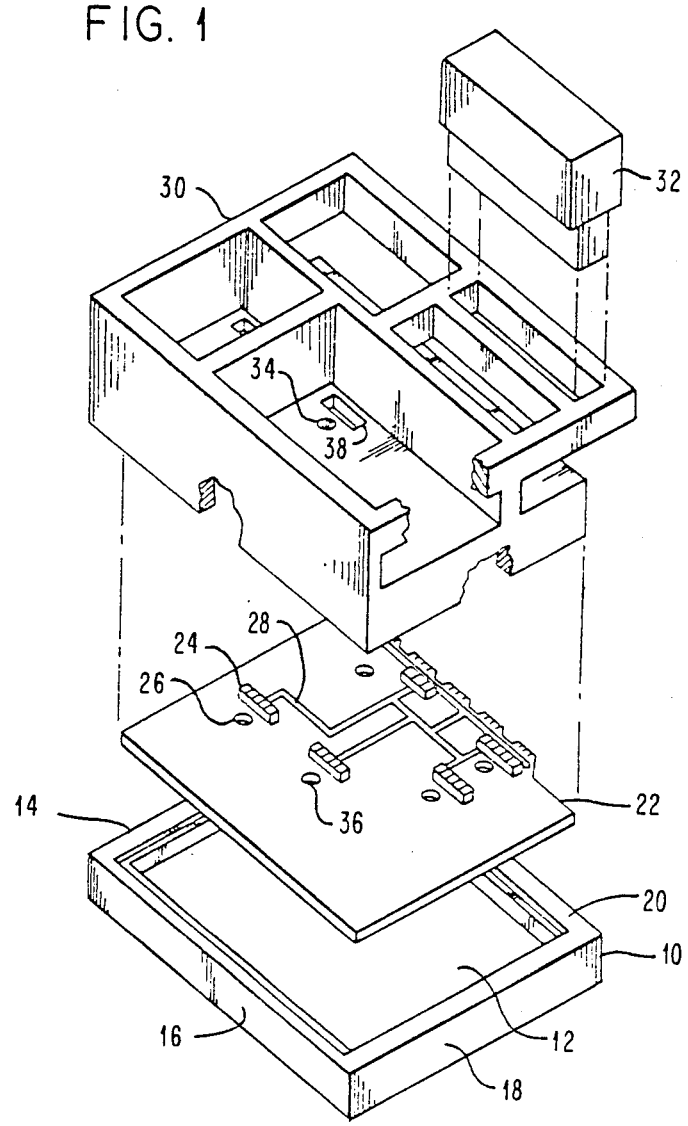
FIG. 1 is an exploded, perspective view of a terminal structure in which the present invention could be practiced.

FIG. 1 is a partial, exploded perspective view of a terminal device into which the present invention may be incorporated. The device includes a base 10 with a solid floor 12 and vertical sidewalls 14, 16, 18 and 20. A power distribution board 22 rests on the sidewalls of the base 10. The four sidewalls and floor of base 10, together with the bottom surface of power distribution board 22 define a closed optical chamber which serves as the distribution medium for optical data and control signals. More details as to the manner in which the signals are distributed through the chamber are provided later.

The power distribution board 22 includes a plurality of power connectors, such as connector 24, and a plurality of optically transparent ports, such as opening 26. The connectors 24 are linked through a pattern of conductors 28 which distribute AC or DC voltages generated by a power supply (not shown). The power distribution board 22 also carries the components required to interface remote units to the remainder of the terminal. A more complete description of these components is provided below.

A frame 30 overlies the power distribution board 22 and rests directly on the base 10. Frame 30 includes a number of rectangular openings or bays for receiving largely self-contained functional units, such as functional units 32. Each functional unit which is plugged into one of the bays in frame 30 includes an optical transducer. The transducer includes a light emitting device which can inject optical energy directly into the optical chamber through aligned openings in the power distribution board 22 and the frame 30. Openings 34 and 36 are examples of these aligned openings. Each functional unit also includes a power connector which can be mated to one of the power connectors on power distribution board 22 through a rectangular opening in the floor of frame 30. Opening 38 is an example of such a rectangular opening.

The manner in which integrated functional units (that is, units which plug directly into frame 30) communicate through the optical chamber is described in more detail in each of the co-pending applications identified earlier. The present invention pertains to a circuit for providing an interface between remote functional units and the remainder of the terminal. A remote functional unit is considered to be any unit which is connected to the remainder of the terminal through a signal-carrying cable. Displays, bar code scanners, produce scales, etc., are examples of typical remote functional units for a terminal used in a supermarket/retail store environment.

Figure 2:
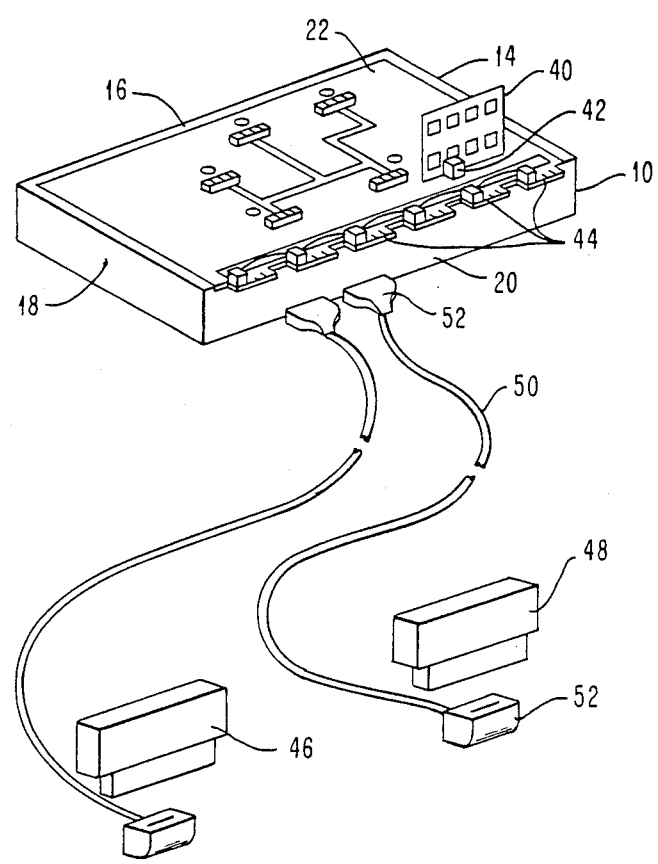
FIG. 2 is a simplified, rear perspective view of such a terminal showing some of the details of the interface circuit's physical structure.

FIG. 2 is a rear perspective view including the base 10 and the power distribution card 22. The interface circuit includes an analog card 40 which includes a primary optical transducer 42. The transducer 42 includes an optical detector which responds to optical energy being propagated through the chamber to generate a representative electrical signal. The electrical signal is distributed via printed controls to each of several connectors 44 on the power distribution board 22. More details about the nature of this connection are provided later. The primary transducer 42 also includes a light emitting device capable of injecting optical energy into the chamber. In a preferred embodiment, the light emitting device in primary transducer 42 is driven by a single signal which is a logical OR of the signals received from all of the remote functional units.

For purposes of illustration, only two remote functional units 46 and 48, are shown in the figure. The number of functional units which could be accommodated is limited only by the number of the connectors 44 available on the rear edge of the power distribution board. Each functional unit, (for example functional unit 48) is connected to the terminal through a signal carrying cable 50 having suitable connectors at each end. Each cable 50 is terminated in connector housing 52. Preferably, each of the remote functional units 46 and 48 has an optical/physical interface which allows that unit either to be plugged directly into the power distribution board 22 within the frame 30 (FIG. 1) or into the terminating connector 52 at one end of the signal-carrying cable 50. The use of such a standardized interface allows a functional unit to be used either as an integral component of the terminal or as a remotely located component.

Figure 3:
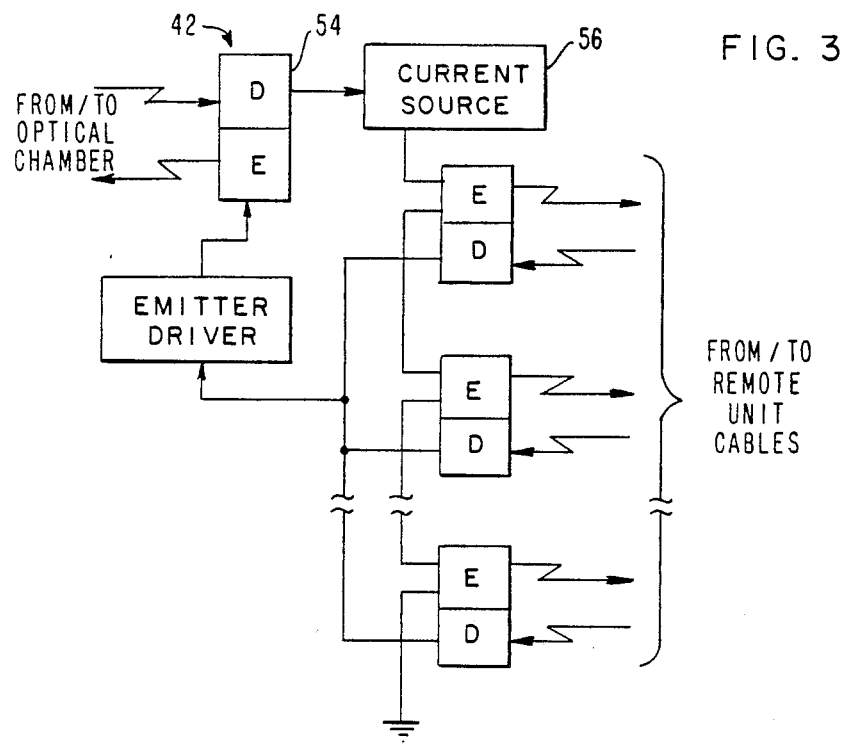
FIG. 3 is a schematic diagram of one enbodiment of the interface circuit.

FIG. 3 is a schematic diagram of a preferred form of the interface circuit between the optical chamber and the remote functional units. The primary transducer 42 mounted on analog card 40 includes a single light detecting element 54 which detects optical energy being propagated through the optical chamber. The output of the light detecting element 54 modulates current provided by a source 56 to provide an electrical signal representative of the optical signal in the chamber. The modulated electrical signal is used to drive a plurality of emitters (E) associated with different secondary transducers at the connector areas 44. The same signal is applied or broadcast to all of the emitters for the secondary transducers without regard to the identity of the functional unit for whom the signal is ultimately intended. Each of the emitters supplies the same signal to its associated remote functional unit through the signal carrying cable.

In one embodiment, the signal carrying cable could be a fiber optic cable which would transmit the optical signal generated by the light emitting element. Of course, it would be possible to eliminate a light emitting element altogether in each of the secondary transducers and to provide an electrical link between the output of current source 56 and signal-carrying electrical cables.

Each of the secondary transducers also includes an element capable of detecting signals received from the associated remote functional unit. In the preferred embodiment, the detector is an optical detector responsive to optical signals transmitted through the signal-carrying cable. The output of each of the detectors is logically ORed at an input to an emitter driver circuit 58 which drives the single light emitting element 60 of the primary transducer 42. The detectors in the secondary transducers and the emitter driver circuit 58 perform a concentrating function so that the primary transducer is driven by a single signal regardless of the number of remote functional units which are attached to the terminal. Thus, all remote functional units interface with the optical chamber through a single primary transducer.

Figure 4:
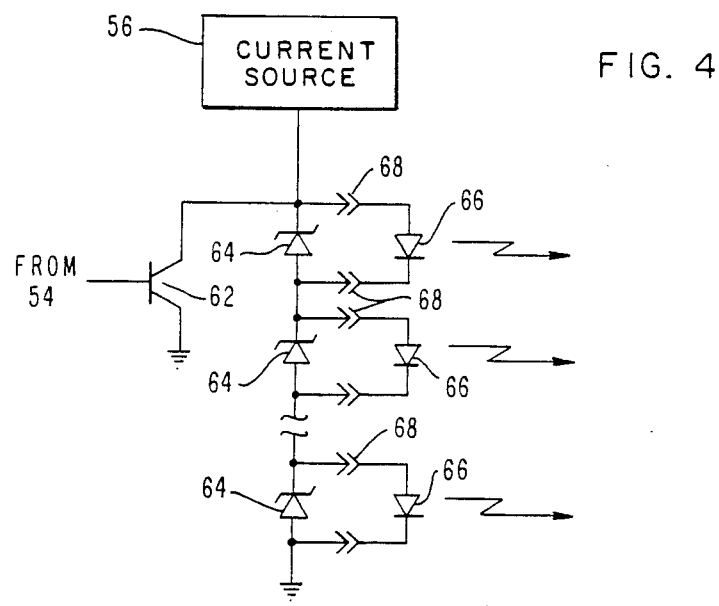
FIG. 4 is a schematic diagram of the distributor or emitter section of the interface circuit.

FIG. 3 indicates that modulated current provided by source 56 is supplied to each of the secondary transducer emitters in series. FIG. 4 shows a preferred form of this series circuit. The output of detector 54 controls a shunt transistor 62 which is connected in parallel with the secondary transducer emitter circuits. Each secondary transducer emitter circuit includes a Zener diode 64 connected in parallel with a light emitting diode 66. The light emitting diode 66 in each such circuit may be connected permanently in parallel with the associated Zener diode 64. There are, however, advantages to having the light emitting diode provided as an integral part of the connector 52 at one end of the signal-carrying cable. The possible physical incorporation of the light emitting diode 66 into the cable/connector structure is represented by the symbols 68.

In an arrangement of the type described, the voltage drop across a light emitting diode 66 is normally small enough to allow the Zener diode 64 to appear as an open circuit. If, however, the light emitting diode fails in an open circuit mode or is removed, perhaps by unplugging the cable, full current provided by source 56 will be imposed across Zener diode 64, causing the Zener diode to break down and supply the full current to the remaining light emitting diodes in the series circuit. Thus, the removal or failure of one of the LEDs 66 does not affect the remaining LEDs.

Transistor 62 acts as a simple signal modulator for current provided by source 56. If the detector signal supplied to the base of transistor 62 is high enough, transistor 62 switches into a conductive state and current provided by source 56 is diverted directly to ground. The light emitting diodes 66 would be shut off. If the detector signal is low, transistor 62 is non-conductive and current supplied by source 56 flows along the series current path through each of the light emitting diodes 66. The combination of the current source 56, the transistor 62 and the individual light emitting diode 66 provides a broadcast function; that is, a single signal detected in the optical chamber is broadcast to all attached remote functional units.

Figure 5:
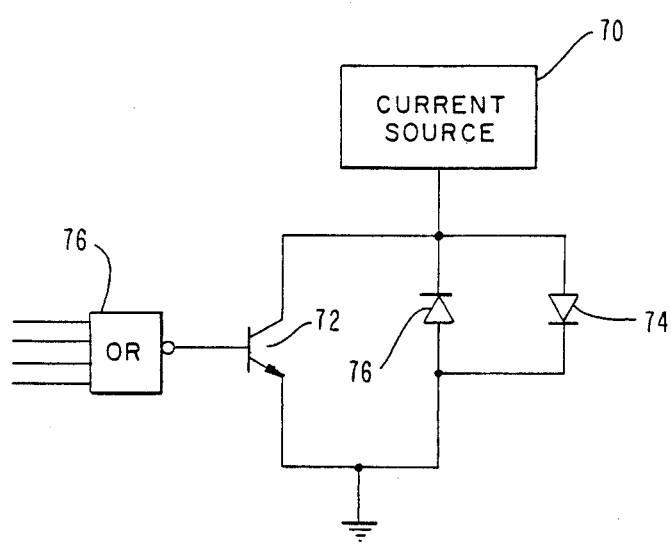
FIG. 5 is a schematic diagram of the detector or concentrator portion of the interface circuit.

FIG. 5 is one embodiment of circuitry capable of concentrating signals received from the remote functional units. The concentrator circuitry includes a current source 70 and a number of switching transistors 72 connected in parallel with a light emitting diode 74 and a carrier-dissipating diode 76. The base drive signal for the transistor 72 is provided by an OR-NOT gate 78 having multiple inputs from the remote functional units. If any remote functional unit provides a high level signal, transistor 72 is biased into a non-conductive state and current is supplied to the light emitting diode 74. Obviously, it is possible for more than one remote functional unit to provide a drive signal at any given time. To avoid garbled, overlapping signals, the machine architecture and programming has to establish certain protocols which assure that only one remote functional unit provides a responsive signal at a time. The establishment of such protocols is beyond the scope of the present invention.

The description has dealt with the transmission of control and data signals between remote functional units and the optical chamber in the terminal base. For maximum flexibility in locating remote functional units, necessary AC or DC voltages could be provided through the cable to the remote functional units using separate electrical conductors from the data/control signal conductors in the cable.

While there has been described what are considered to be preferred embodiments of the invention, variations and modifications therein will occur to those skilled in the art once they become acquainted with the basic concepts of the invention. Therefore, it is intended that the appended claims shall be construed to include not only the preferred embodiments but all such variations and modifications as fall within the true spirit and scope of the invention.

We claim:

1. In a terminal device having one or more integrated functional units which communicate with each other by means of optical signals propagated through a closed chamber, a circuit for interfacing one or more remote functional units to the chamber where each of the remote functional units is connected to the terminal device through a signal carrying cable, said interfacing circuit being characterized by:
   (a) an optoelectronic transducer having a single detector responsive to optical energy extent in the chamber for generating representative signals and a single emitter for converting signals from the remote functional units to an optical format suitable for injection into the chamber;
   (b) a plurality of signal producing elements, each located at the terminal end of one of the signal-carrying cables;
   (c) signal conducting means connected to the detector and to said plurality of signal producing elements for conducting the representative signals to each of the signal producing elements; and
   (d) means being responsive to the signals received through any of the cables from the remote functional units and operable for logically combining said received signals to provide a single drive signal for enabling the single emitter in said optoelectronic transducer.

2. An interfacing circuit as defined in claim 1 wherein said signal producing elements and said signal conducting means form a single series signal path whereby a defect in one of the signal carrying cables does not disrupt the signal carrying capabilities of other signal carrying cables.

3. An interfacing circuit as defined in claim 2 wherein said means for logically combining the signal includes a logical OR circuit having inputs from each of the signal-carrying cables and a single driving output to the emitter in said optoelectronic transducer.

4. An interfacing circuit as defined in claim 2 wherein said signal conducting means further includes a plurality of shunting elements, each being connected in parallel with one of said signal producing elements and each being cable of conducting the representative signals if an open circuit condition occurs at the associated signal producing element.

5. An interfacing circuit as defined in claim 4 wherein said means for logically combining the signal includes a logical OR circuit having inputs from each of the signal-carrying cables and a single driving output to the emitter in said optoelectronic transducer.

6. An interfacing circuit as defined in claim 4 wherein the shunting elements include a plurality of zener diodes.

7. An interfacing circuit as defined in claim 1 wherein each of said signal producing elements comprises an emitter for generating optical signals suitable for transmission through an optical signal-carrying cable.

8. An interfacing circuit as defined in claim 1 wherein said means for logically combining the signals includes a logical OR circuit having inputs from each of the signal-carrying cables and a single driving output to the emitter in said optoelectronic transducer.

9. An interface circuit as defined in claim 1 wherein the means for logically combining the signals includes a Nor gate having multiple inputs and a single output;
  a switching means operable coupled to the single output;
  a current source operable coupled to the switching means;
  a current control means coupled to the current source and the switching means; and
  a light emitting diode positioned to be in series with the current source and to be in parallel with the switching means and the current control means.

10. The interface circuit of claim 9 wherein the switching means includes a transistor.

11. The interface circuit of claim 9 wherein the current control means includes a diode.

12. In a terminal device having one or more integrated functional units which communicate with each other by means of optical signals propagated through a closed chamber, a circuit for interfacing one or more remote functional units to the chamber where each of the remote functional units is connected to the terminal device through a signal-carrying cable, said interfacing circuit being characterized by:
  a primary transducer having a single optical detector responsive to optical energy extant in the chamber for generating representative electrical signals and a single optical emitter for converting signals from the remote functional units to an optical format suitable for injection into the chamber;
  a plurality of secondary transducers each optically coupled to the terminal end of one of said signal-carrying cables and having an optical emitter capable of generating optical signals for injection into the cable and an optical detector for generating electrical signals representative of optical signals originating at the remote functional units;
  means for distributing the representative electrical signals generated by the primary transducer detector to each of the secondary transducer emitters; and
  means for logically OR'ing the signals generated by any of the secondary transducer detectors to produce a single drive signal for driving the primary transducer optical emitter.

13. An interfacing circuit as defined in claim 12 wherein said secondary transducer optical emitters are connected in series with one another.

14. An interfacing circuit as defined in claim 13 further including a shunting element connected in parallel with each of said secondary transducer optical emitters, each shunting element being capable of conducting any signal applied thereto if an open circuit condition occurs at the associated secondary transducer optical emitter.

15. In an electronic device having one or more functional units which communicate with each other by means of optical signals diffused through a common cavity, a circuit for interfacing one or more remote functional units to the common cavity characterized by:
  an optoelectronic transducer having a single detector for converting signals from the common cavity to electrical format and a single emitter for converting signals received from remote functional units to optical format for diffusion through the common cavity;
  a plurality of serially-connected signal ports, each port being capable of providing the same signal for broadcast to a remote functional unit coupled to the port through a signal transmitting cable;
  means responsive to signals generated by the single detector for controlling the current supplied to said serially-connected signal ports; and
  means responsive to a signal received from any coupled remote functional unit for controlling the current supplied to the single emitter.

16. A circuit arrangement operable for concentrating signals received from remote functional units comprising:
  a NOR gate having multiple inputs and a single output, said multiple inputs being operable for receiving electrical signals from the remote functional units;
  a switching transistor having a base electrode connected to the single output, an emitter electrode coupled to a reference potential and a collector electrode;
  a current source coupled to the collector electrode;
  a means for controlling the direction of current flow coupled between the reference potential and the current source; and
  a light emitting diode disposed in parallel with the means for controlling the direction of current flow and having an input electrode being coupled to the current source and an output electrode being coupled to the reference potential.

* * * * *